(No Model.) 3 Sheets—Sheet 2.
W. WILKES.
COTTON THINNER AND CULTIVATOR.
No. 283,181. Patented Aug. 14, 1883.
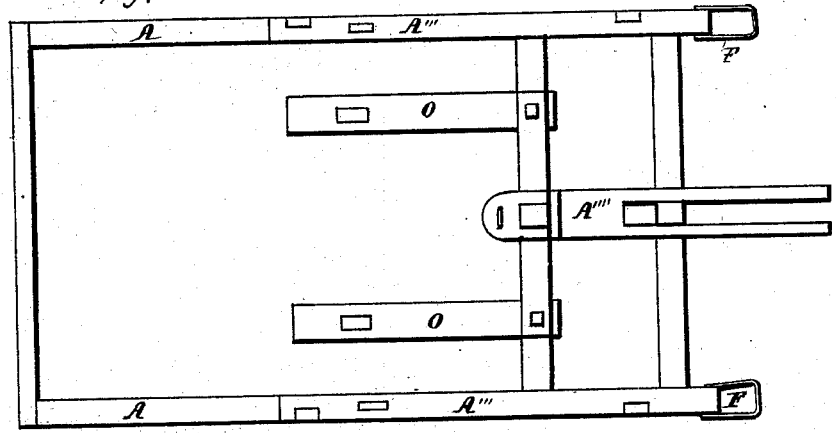
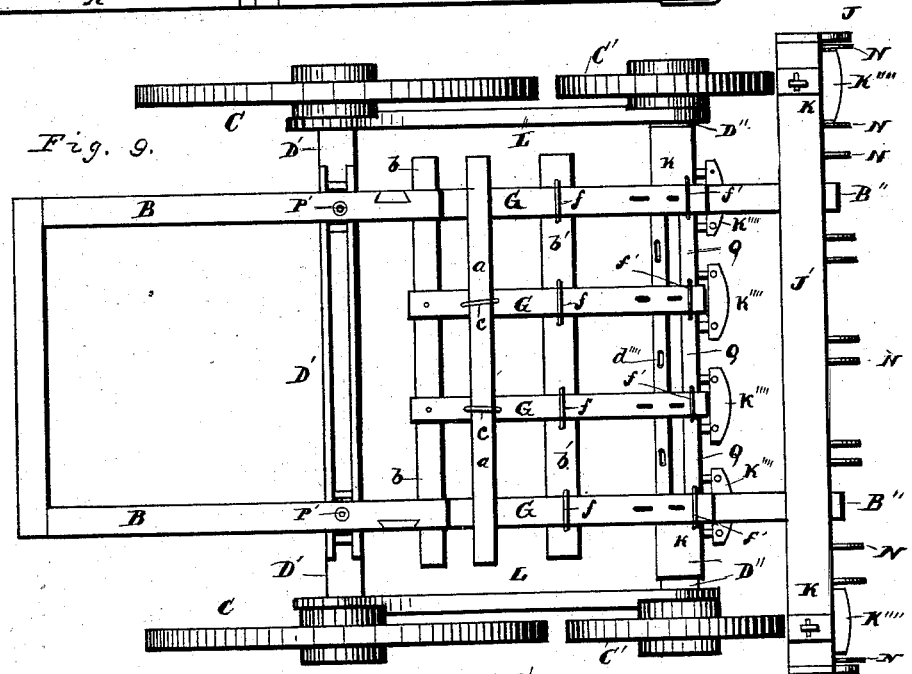
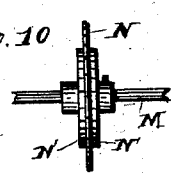
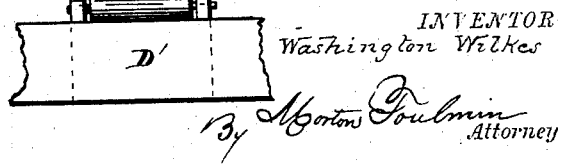
WITNESSES
INVENTOR
Washington Wilkes
By Morton Toulmin
Attorney

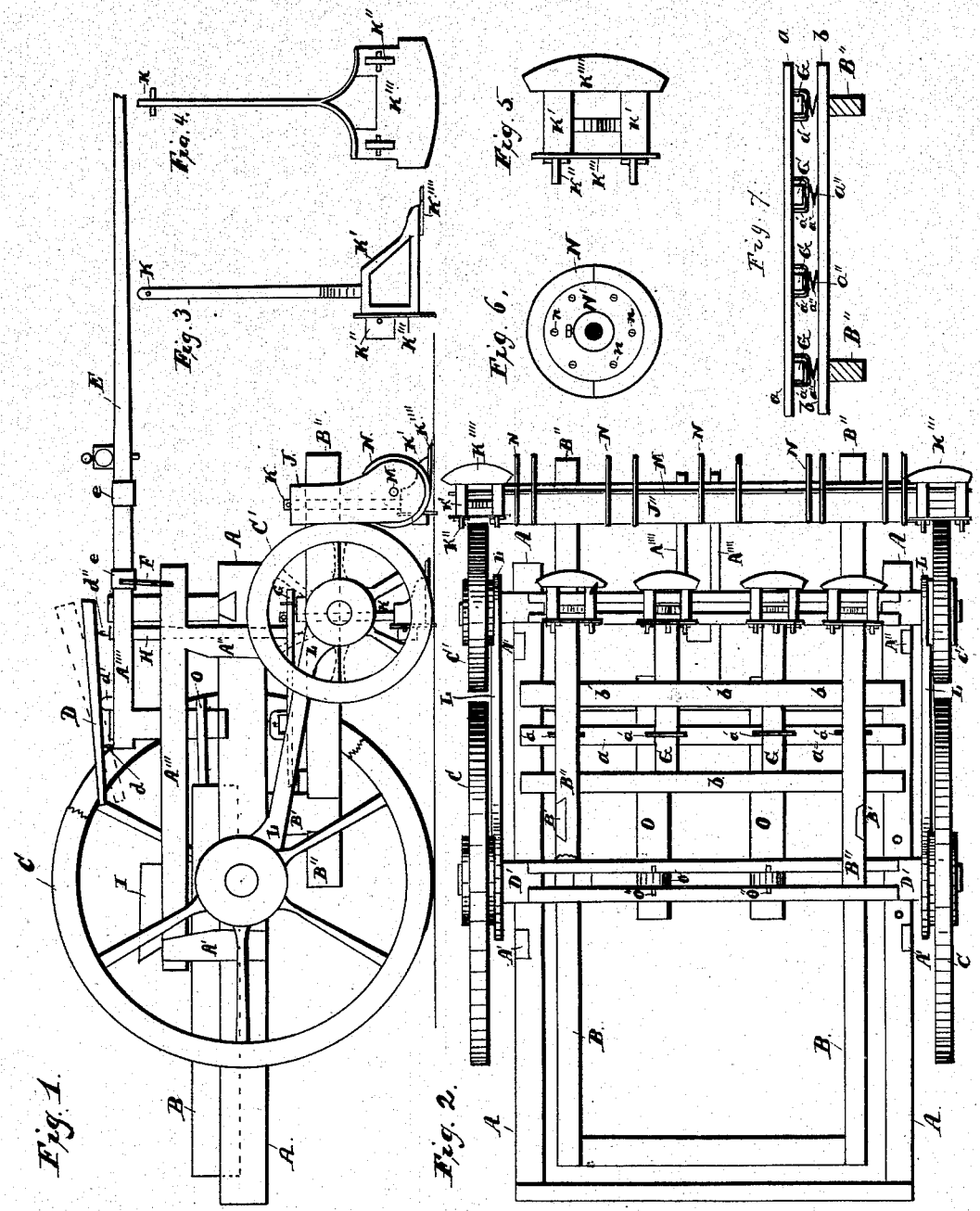

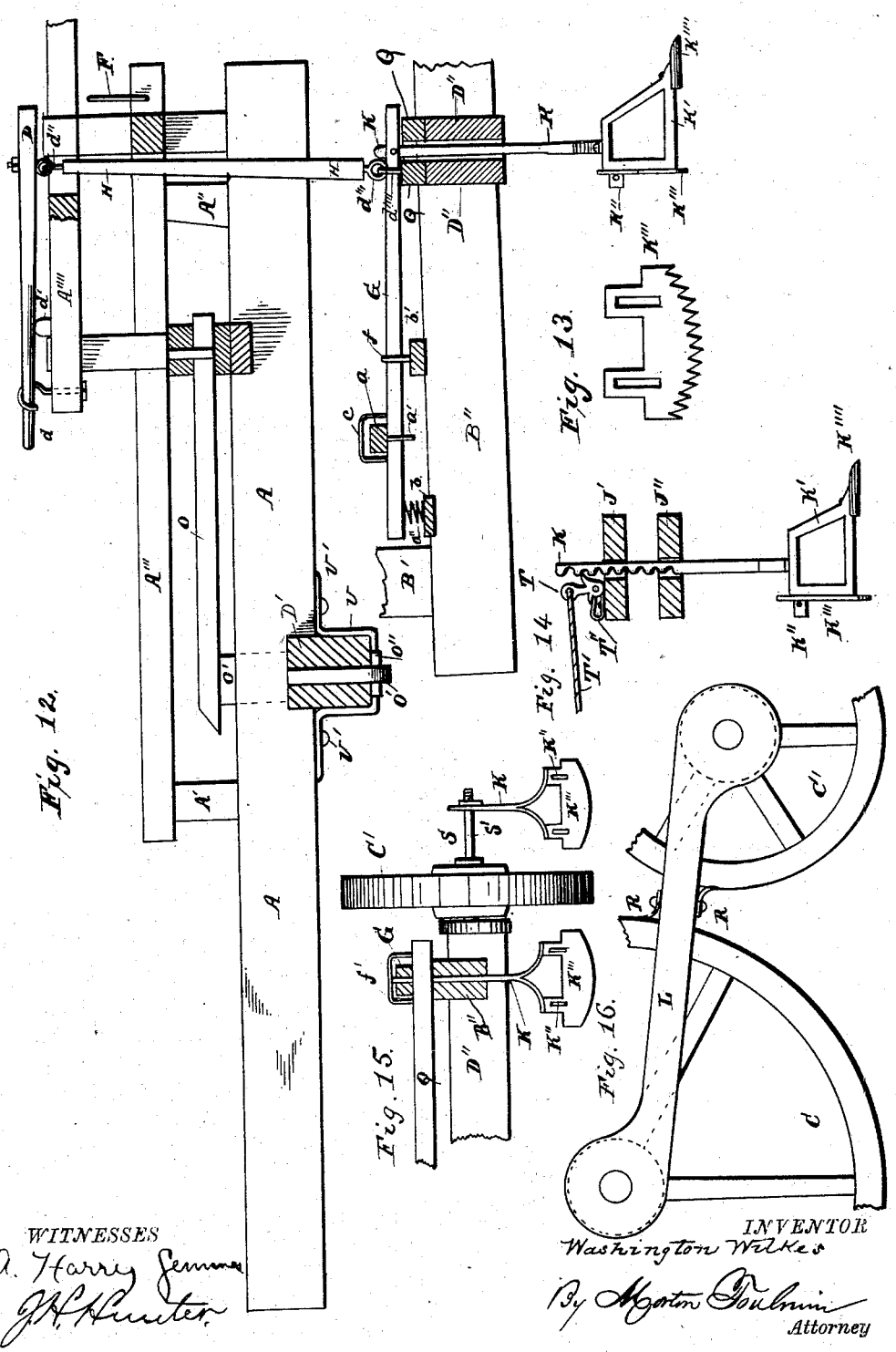

United States Patent Office.

WASHINGTON WILKES, OF SYLACAUGA, ALABAMA.

COTTON THINNER AND CULTIVATOR.

SPECIFICATION forming part of Letters Patent No. 283,181, dated August 14, 1883.

Application filed February 21, 1883. (No model.)

*To all whom it may concern:*

Be it known that I, WASHINGTON WILKES, a citizen of the United States, residing at Sylacauga, in the county of Talladega and State of Alabama, have invented certain new and useful Improvements in Cotton Thinners and Cultivators, of which the following is a specification, reference being had therein to the accompanying drawings.

This invention relates to new and useful improvements in cultivators, and has for its object the cultivation of cotton, corn, or other agricultural productions to which it may be adapted.

In the drawings forming a part of this specification, Figure 1 is a side elevation of the entire machine with some of the parts broken away. Fig. 2 is a view taken from the bottom, showing the under side of the machine. Fig. 3 is a side elevation, in detail, of one of the hoes and scrapers. Fig. 4 is a rear view of one of the hoes and scrapers. Fig. 5 is a bottom view of a hoe and scraper. Fig. 6 is a side elevation of one of the circular colters or cutters, showing its construction in detail. Fig. 7 is a detached view of the ends of the hoe-pedals, cross-piece, and springs. Fig. 8 is a plan view of the upper frame-work removed from the machine. Fig. 9 is a plan view of the machine with that portion represented by Fig. 8 removed therefrom. Fig. 10 is a detached view, in detail, of one of the circular cutters or colters with part of its shaft broken away. Fig. 11 is a detailed view, partly in section, of the frame B and the hind axle and the means employed to form the connection of the two to each other. Fig. 12 is a side elevation, partly in section, of the upper frame, (shown in Fig. 8,) and also a portion of the lower frame, B″ B′, and the means of suspending the latter to the former. Fig. 13 shows a modified form of scraper or rake to be applied to the hoes in place of the kind shown in Fig. 4. Fig. 14 is a side elevation of one of the hoes, having its shank cut into rack-teeth, with pawl adapted to hold it up. Fig. 15 shows one of the front wheels with one of the hoes on the inside of the wheel and another on the outside suspended to a bar on the outer end of the axle; Fig. 16, a part of one hind and of one front wheel and of one of the guiding or connecting bars with wheel-scrapers attached.

The letter A represents the main frame of the machine, which, for convenience in description, I call the "carrier-frame."

The letter B indicates the lower frame, which carries the operating devices, for which reason I call it the "operator."

The letter C represents the hind wheels, and C′ the front wheels.

D is a lever.

D′ is the hind axle.

D″ is the front axle.

E is the pole, (or shafts when one horse is used).

F are straps secured to the frame A‴, in which the ends of the shafts (when used) are inserted and held.

G are pedals, from the front ends of which the clipping-hoes are suspended by means of their shanks K and suitable pins or rivets.

H is a vertical rod, the upper end of which is attached to the lever D by hooks $d''$, and the lower end to the slotted beam Q by means of the hooks or eyebolts $d'''$ and $d''''$.

I is the seat.

J are hangers at each end of the beams J′ J″, which carry the shaft M.

K are the shanks of the hoes and scrapers.

K′ are the frames of the hoes and scrapers, from which project rearwardly the tenons K″, which pass through slots in the scrapers K‴, and are secured thereto by transverse pins.

K″″ are the knives, which are to be made of steel of good quality. The frames K′ are to be made of Swede iron and the scrapers of iron or of steel.

L are connecting rods or plates which fit over the axles of the fore and hind wheels between the wheels and the body of the cultivator. They are provided with an opening at each end for the passage of the axles. That at the rear is slotted or elongated, in order to give the hind axle a little play. That in the front end is annular.

M is a shaft or cylinder having bearings in the hangers J. It supports a number of circular cutters or colters, which either revolve with it or upon it. I prefer to make the knives or cutters N of semicircular form and of steel, and clamp them together with circular plates of wood or metal N′, secured by bolts or screws n.

O are timbers, forming part of the upper frame, to which are secured, at the rear ends, pieces O′, having tenons o′, which project downwardly and pass through the slot in the hind axle, and are secured thereto by the pins o″.

P is a roller, which turns upon its journals in bearings P‴, secured to the hind axle. It is furnished with bolt P′, which passes through the timber B of the lower frame, to which it is secured by the nut P″. This manner of connecting the frame B with the axle D′ permits it to oscillate thereon.

Q is a slotted timber resting upon the front axle, D″, (which is also slotted.) The slot in the axle D″ and in the timber Q permits the passage of the shanks K of the clipping-hoes.

The letter R indicates scrapers attached to the connecting-bar L, which are intended to scrape and keep the wheels C and C′ in a clean condition.

S is an elongated nut fitted to the front axle, and has a short bar, S′, with a nut and screw at the end, adapted to receive and hold the shank of a clipping-hoe.

T is a pawl adapted to engage in the ratchet-teeth of the shank K, and thereby support the hoe in an elevated position.

T″ is a spring, and T′ is a rope or chain attached to the pawl in such manner as to enable the pawl to be withdrawn from the ratchet-teeth of the shank K by the driver, in order to permit the hoe to drop. The hoes to be provided in this manner are those just in front of the fore wheels, which I call the "grading-hoes."

U are straps which pass under the hind axles, and are secured to the frame A by bolts or screws U′, thus fastening the two together.

b is a cross-bar resting upon the frame B″. It forms a support for the spiral springs a″, which support the hoe-treadles G.

a is a cross-bar resting on the treadles G, and is provided with staples a′ to keep it in place.

c are straps or staples in the treadles G, which extend over the top of the cross-bar a and prevent the bar from slipping too far in either direction.

f are straps or staples which retain the treadles G in a proper position upon the cross-bar b′.

f′ are straps or staples which retain the front ends of the treadles G in their proper places.

e e are metal bands which pass over the slotted portion of the beam A″″ and the pole E, and secure the latter in its place.

d is a hook which holds the end of the lever D down.

d′ is the fulcrum upon which the lever D rests when it is forced down, which operates to lift the front wheels and hoes clear of the ground, so as to permit the machine to be turned around upon its hind wheels.

The hangers J may be arranged with slots, so as to have an upward and downward movement for the proper adjustment of the circular cutters N.

The axles of the machine are composed of four pieces—two side pieces of wood or of iron, with a short piece of iron between them, secured at each end, forming spindles upon which the wheels revolve. This method of construction gives greater strength for the same weight of material at the same time that it provides a ready means of contracting or expanding the width of the machine when one or two horses are to be employed.

The hoe-frames are to be made open, as that construction permits the ready escape to the dirt in the rear of the hoe-blade as it cuts through the ridge, and the rakes or scrapers at the rear of the hoe-frames are to remove that loose dirt and cut grass (if any) into the balk of the row.

The hoe-blades are of scoop shape, and the rakes or scrapers in the rear have a curved outline (at the bottom) to fit the excavated furrows made by the hoe-blades, the object of which is to avoid covering up the hill of cotton or other growth designed to remain, and also to lighten the draft by dividing it between the hoes and rakes or scrapers, the former cutting the soil and vegetation and the latter removing it. I call the hoes in front of the front wheels "grading-hoes," the object being to preserve the grade made by them by removing the loose soil with the rakes or scrapers. The hoe-blades may be bolted either on top of the rib of the hoe-frames, or on the under side. I prefer the former plan.

I call the frame A and wheels C, with the pole or shafts, the "carrier" part of my machine, and that portion composed of the frame B, the front wheels, hoes, rotary cutters, &c., the "operator" part, which is connected to the former by the rollers P, connecting-bars L, and suspending-rod H.

To operate the machine, place two planks under the wheels to get the level, then let the grading-hoes down within about an inch or less of these planks, set the clipping-hoes as much higher than the grading-hoes as the height or depth of cotton or other ridge may require, so that the bottom part of the hoes will cut about an inch deep, the tip of the hoes next to the remaining hill of cotton just cutting beneath the surface of the ridge. When the turning-point has been reached across the row, the driver reaches the lever D, and bears it down to catch in the staple d. By this means the operator, wheels, and all are lifted up from the ground. The machine is now turned upon its hind wheels, and the driver ranges with the furrows already made at a suitable advance in the next work to be done, and, placing two side wheels in the track already made by the opposite two, he lets down the operator. The grading-hoe on this side is then lifted up and suspended by any suitable device—such as shown, for instance, in Fig. 14—and in this manner the work is continued up to the end of each row only, one grading-hoe cutting at the same time after the first row is completed. The rotary cutters N are to cut weeds, &c., in top of the cotton-ridge.

I propose to make machines of three sizes, the smallest provided with handles to be operated by the driver while walking, and drawn by one horse, another provided with seat for the driver, also for one horse or mule, and the largest with seat for the driver, to be drawn by two horses. Each of these machines will be substantially the same, but provided with such changes in the details as to adapt them to such purposes. In the one-horse machine of the smallest size I propose to bolt the handles to the frame B in such manner that they will form levers by which the front wheels and attachments may be lifted clear of the ground, the hind axle forming the fulcrum. In this construction I propose to cut the rear of the bar H into ratchet-teeth, as shown in the shank of a grading-hoe in Fig. 14, the pawl T and spring T'' being attached to the frame A'''', and the cord T' carried back to the hands of the driver, who walks behind the machine.

Having described my invention, what I desire to secure by Letters Patent and to claim is—

1. In a cultivator, the combination of the frame A A' A'' A''' A'''' and the pole or shafts E, with slotted axle-tree D' and wheels C, substantially as described, and for the purposes set forth.

2. In a cultivator, the combination of the frame B B' B'' and clipping and grading hoes with slotted axle D', having roller-connections P, P', P'', and P''', substantially as described, and for the purposes set forth.

3. In a cultivator, the combination of slotted axle D' and connecting-rods L with slotted axle D'', substantially as shown and described, and for the purposes set forth.

4. In a cultivator, the combination of frame A'''', fulcrum d', hook d, and lever D with suspending-rod H, flexibly connected to axle D'', substantially as described, and for the purposes set forth.

5. In a cultivator, the combination of axles D' D'' with connecting-bar L, having scrapers R, substantially as described, and for the purposes set forth.

6. In a cultivator, the combination of hoe-pedal G, staple c, staple a', and cross-bar a with spring a'' and hoe-shank K, substantially as shown and described, and for the purposes set forth.

7. In a cultivator, the combination of shank K and frame K' with hoe-blade K'''' and scraper K''', substantially as shown and described, and for the purposes set forth.

8. In a cultivator, the combination of shank K, cut with ratchet-teeth, and frames J' J'' with pawl T, having cord T' and spring T'', substantially as described, and for the purposes set forth.

9. In a cultivator, the combination of frame B'', axle D'', and frames J' J'' with grading and clipping hoes, substantially as described, and for the purposes set forth.

In testimony whereof I affix my signature in presence of two witnesses.

WASHINGTON WILKES.

Witnesses:
D. T. CASTLEBURY,
THOMAS HAYDEN.